United States Patent [19]

Levine

[11] 4,190,802
[45] Feb. 26, 1980

[54] DIGITAL DEMODULATOR FOR PHASE SHIFT KEYED SIGNALS

[75] Inventor: Stephen N. Levine, Hoffman Estates, Ill.

[73] Assignee: Motorola, Inc., Schaumburg, Ill.

[21] Appl. No.: 934,299

[22] Filed: Aug. 17, 1978

[51] Int. Cl.[2] .......................................... H04L 27/22
[52] U.S. Cl. .................................... 325/320; 178/88; 329/104; 329/126
[58] Field of Search ........................ 325/320, 325, 30; 178/88, 67; 329/104, 126

[56] References Cited
U.S. PATENT DOCUMENTS

| | | | |
|---|---|---|---|
| 3,368,036 | 2/1968 | Carter et al. | 325/320 |
| 3,493,884 | 2/1970 | Kulp | 331/17 |
| 3,568,066 | 3/1971 | Fujimura | 325/320 |
| 3,993,956 | 11/1976 | Gilmore et al. | 325/320 |

*Primary Examiner*—Marc E. Bookbinder
*Assistant Examiner*—Peter Durigon
*Attorney, Agent, or Firm*—Rolland R. Hackbart; James W. Gillman

[57] ABSTRACT

A digital demodulator for differential phase shift keyed (DPSK) signals includes two pairs of 1-bit integrators for continuously taking the phase difference between successive DPSK bits. Each DPSK bit is subdivided into a plurality of bits, for example 15 bits. A weighted output signal having 4 bits is provided by each 1-bit integrator for each of the bits corresponding to a DPSK bit. The weighted output signals from each pair of 1-bit integrators are sine weighted and multiplied. The products are then added together for application to a comparator. The comparator compares the sum of the addition to a predetermined reference signal and provides a demodulated digital signal having a logical state dependent on whether the sum is greater or smaller than the predetermined reference signal.

11 Claims, 3 Drawing Figures

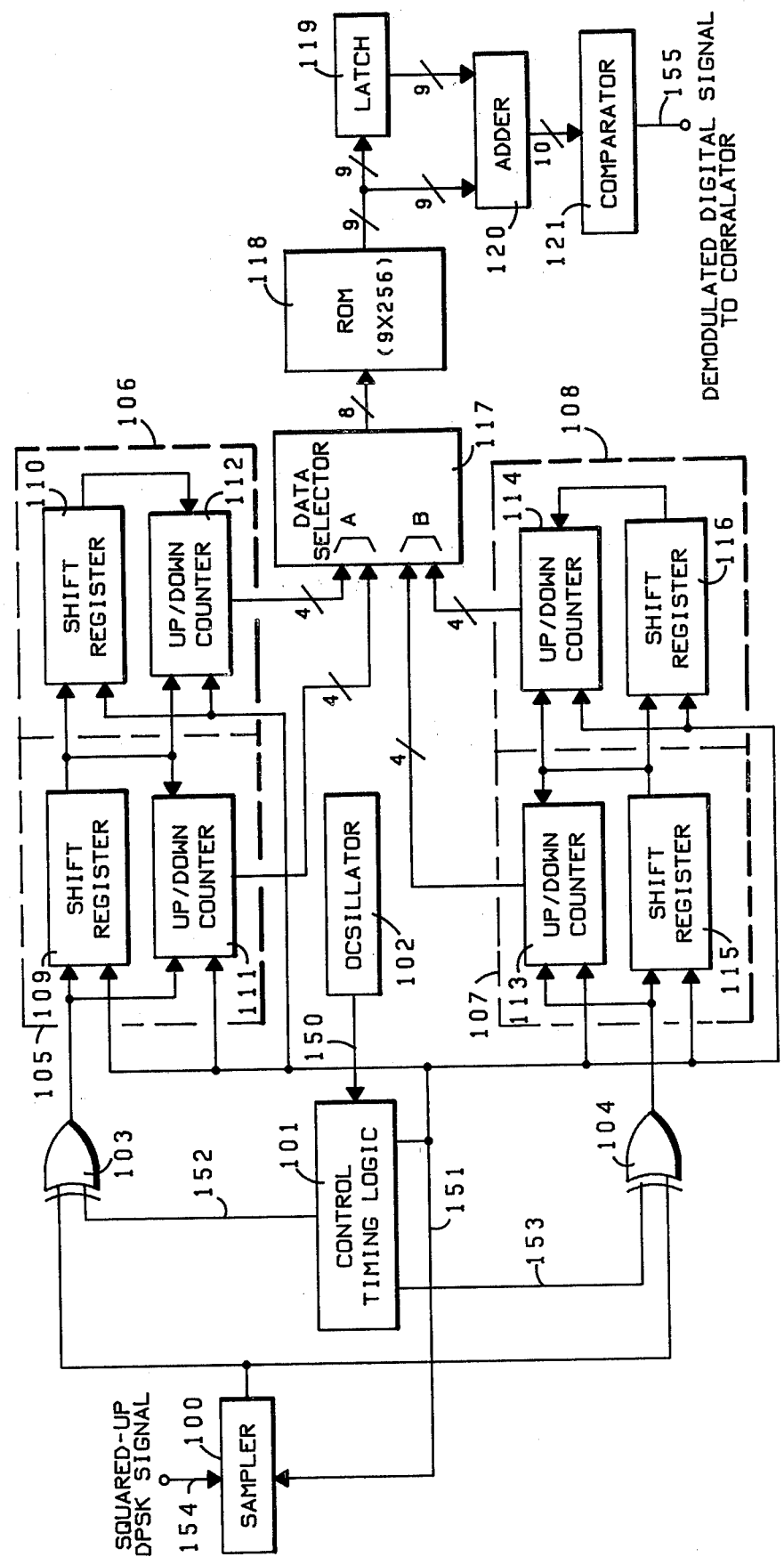

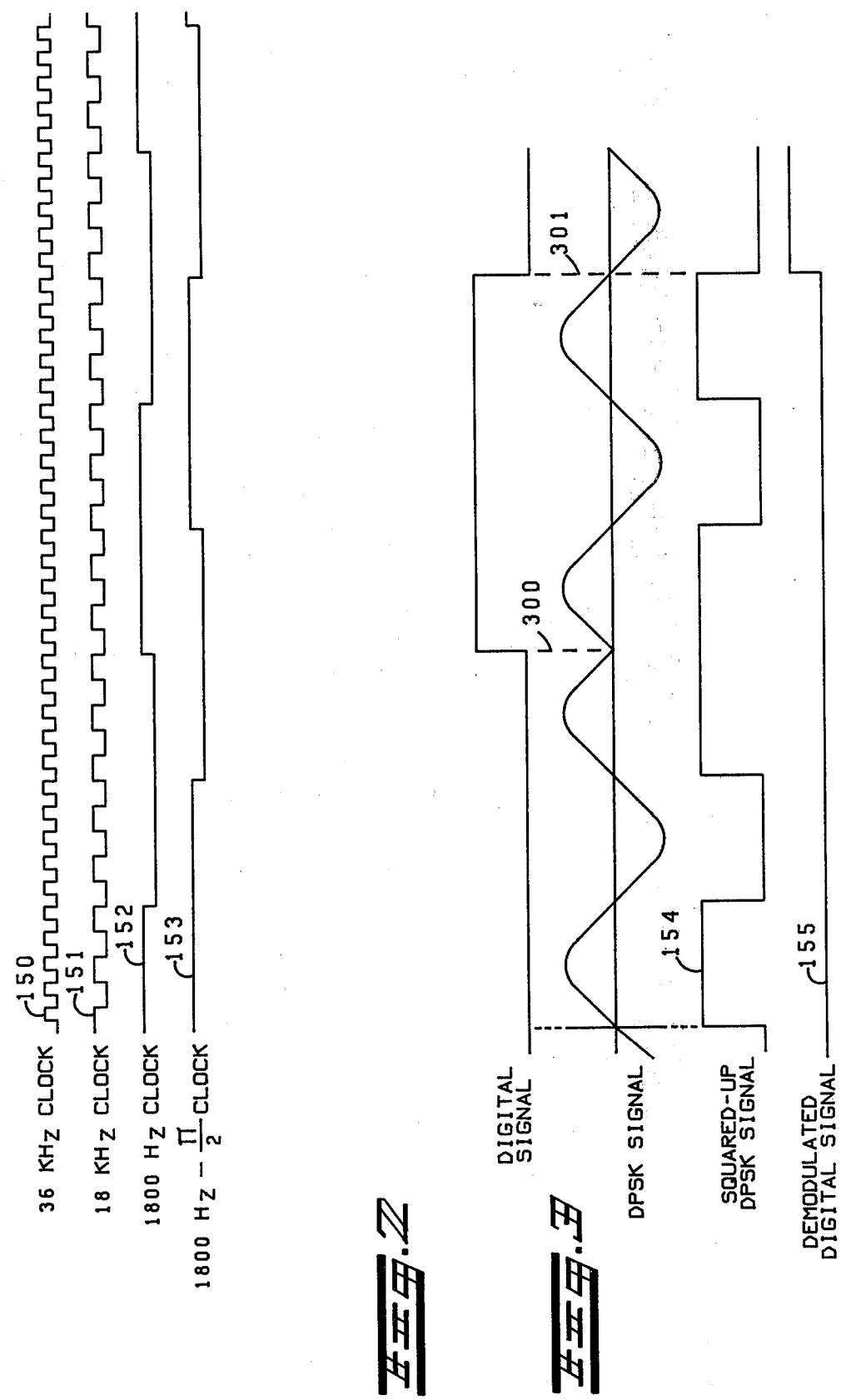

DIGITAL DEMODULATOR FOR PHASE SHIFT KEYED SIGNALS

TECHNICAL FIELD

The present invention relates to a digital demodulation system, and more particularly, to a digital system for demodulation of phase shift keyed signals.

BACKGROUND ART

In prior art digital detection systems for phase shift keyed signals, recovery of the carrier signal is essential for operation. For example, in U.S. Pat. No. 3,993,956, a Costas loop is used to recover the carrier signal and control the detection circuits. Until carrier synchronization is obtained in the Costas loop, the demodulation of data cannot take place. In addition, the data is demodulated a full bit at a time. None of the prior art systems provide for immediate and continuous demodulation of the received DPSK signals.

SUMMARY OF THE INVENTION

It is a general object of the present invention to provide an improved digital demodulator for PSK and DPSK signals.

It is another object of the present invention to provide an improved digital demodulator that continuously demodulates PSK and DPSK signals.

It is a further object of the present invention to provide an improved digital demodulator for PSK and DPSK signals that does not require DPSK carrier synchronization.

In practicing the invention, a digital demodulator for PSK and DPSK digital signals includes an oscillator for providing a master clock signal at a multiple of the carrier frequency, timing circuitry responsive to the oscillator for providing first and second quadrature-related clock signals at the carrier frequency, a sampler for digitally sampling the PSK signal at the master clock frequency and first and second multipliers for multiplying the sampled PSK signal and the first and second clock signals to provide first and second output signals. The first and second output signals are then serially shifted through first and second pairs of 1-bit integrators, respectively. Each PSK bit is subdivided into a number of bits, for example 15 bits. Each 1-bit integrator provides a binary-weighted output signal having, for example, 4-bits. The binary weighted output signals from each pair of one bit integrators are sine weighted, multiplied, added and thereafter applied to a comparator. The comparator provides the demodulated digital signal. The binary state of the demodulated digital signal is determined by comparison of the results of the addition with a predetermined reference signal. For example, a logic zero state may be provided when the results of the addition is less than the predetermined reference signal, and a logic one state may be provided when the results of the addition is greater than the predetermined reference signal.

The PSK signal may include a digital message preceded by a digital start signal having a predetermined number of bits arranged according to a predetermined bit pattern. The demodulated digital signal from the comparator may be applied to a correlator which provides a message indication signal when detecting the presence of the predetermined bit pattern of the digital start signal. Processing of the following digital message may be performed in response to the message indication signal from the correlator.

BRIEF DESCRIPTION OF THE DRAWINGS

FIG. 1 is a block diagram of a digital demodulator embodying the present invention.

FIG. 2 illustrates the waveforms of the control timing signals of the digital demodulator of FIG. 1.

FIG. 3 illustrates the waveforms of the modulated and demodulated data for the digital demodulator of FIG. 1.

DETAILED DESCRIPTION OF THE INVENTION

In FIG. 1, there is illustrated a digital demodulator embodying the present invention. The digital demodulator may be advantageously utilized in a DPSK or PSK signal receiver. The preferred embodiment of the digital demodulator of the present invention demodulates DPSK signals. The DPSK signal 154 may be a continuous serial bit stream or may be a serial digital signal including a digital message preceded by a digital start signal having a predetermined number of bits in a predetermined bit pattern. The digital start signal may be any of a number of suitable start or synchronization signals, such as those described in U.S. Pat. No. 3,586,776 or in U.S. patent application Ser. No. 830,951, entitled "Method and Apparatus for the Synchronization of Data Bit Streams" by John En, filed on Sept. 6, 1977 and assigned to the instant assignee.

The demodulated digital signal 155 from the digital demodulator of FIG. 1 may be applied to a correlator (not shown) which continuously monitors the demodulated data for the predetermined bit pattern of the digital start signal. Upon recognition of the digital start signal, the correlator may provide a message indication signal marking the beginning of the digital message. The digital message following the digital start signal may then be utilized in any suitable manner, such as controlling the operation of the digital receiver and updating information stored in the digital receiver. For example, the digital message may be used to control the operation of a printer, as described in the aforementioned U.S. Pat. No. 3,586,776.

A typical waveform of the squared up DPSK signal 154 that is applied to sampler 100 is shown in FIG. 3. According to DPSK modulation, the phase of the carrier is shifted 180° for every logic one that is transmitted and is not shifted for logic zeroes that are transmitted. Thus, for the digital signal of FIG. 3, the phase of the carrier is shifted for the logic one at 300 and is not shifted for the logic zero at 301. The DPSK signal receiver, such as an FM radio receiver, detects the DPSK signal and provides the squared up DPSK signal 154 of FIG. 3.

In the preferred embodiment, the DPSK signal is transmitted at a carrier frequency of 1800 Hz and at a bit rate of 1200 Hz. Thus, each bit of the digital signal is comprised of one and one-half cycles of the carrier signal (see FIG. 3).

The operation of the digital demodulator of FIG. 1 is synchronized to the master clock signal 150 provided by the oscillator 102. In the preferred embodiment, the master clock signal 150 has a frequency of 36 kHz (see FIG. 2). The control timing logic 101 appropriately divides, as is known in the art, the master clock signal 150 to provide an 18 kHz clock signal 151 which is utilized to synchronize and clock the various functional blocks of the digital demodulator. The control timing logic 101 further provides an 1800 Hz clock signal 152 and a quadrature 1800 Hz clock signal 153, that is phase-shifted by 90° from the 1800 Hz clock signal 152. The clock signals 152 and 153 are applied to EXCLUSIVE OR gates 103 and 104, respectively. The EXCLUSIVE OR gates 103 and 104 multiply the sampled DPSK signal from sampler 100 with the clock signals 152 and 153, respectively.

The multiplied output signals from the EXCLUSIVE OR gates 103 and 104 are then applied to the 1-bit integrators 105-106 and 107-108, respectively. Each 1-bit integrator includes a shift register 109, 110, 115, 116 and an up/down counter 111 to 114. In the preferred embodiment, the shift register stores 15 bits, which corresponds to one complete DPSK bit. Thus, integrators 105-106 and integrators 107-108 provides storage for two successive DPSK bits.

The multiplied output signals from the EXCLUSIVE OR gates 103 and 104 provide signals which, over the time interval of one DPSK bit, have a logic one versus logic zero ratio proportional to the phase difference between the sampled DPSK signal and the respective clock signals 152 and 153. The up/down counters 111 to 114 provide a binary weighted output signal having four bits, which is proportional to the logic one versus logic zero ratio of the DPSK bit stored in the corresponding shift registers. Furthermore, the weighted output signal from each of the up/down counters 111 to 114 is provided continuously for each of the 15 bits of the DPSK bit stored in the corresponding shift register.

The weighted output signal from each of the up/down counters 111 to 114 is derived from the input bit and output bit of the corresponding shift register according to the following:
  (a) if the input bit is a logical one and the output bit is a logical zero, the weighted output signal is incremented by one.
  (b) If the input bit is a logical zero and the output bit is a logical one, the weighted output signal is decremented by one.
  (c) If the input bit is the same logical state as the output bit, the weighted output signal remains unchanged.

Each pair of 1-bit integrators 105-106 and 107-108 continuously provide a pair of weighted output signals such that the phase difference may be continuously taken between the DPSK signal and the clock signals 152 and 153 over the time interval of two DPSK bits. Since there are 15 bits in the shift registers for each DPSK bit, the phase difference may be taken 15 times for each DPSK bit. By ascertaining the phase difference between the two successive DPSK bits, the logical state of the data bits can then be readily ascertained.

Next, each of the binary weighted output signals from the up/down counters 111 to 114 is sine weighted. The sine weighted signals are multiplied together and the products are then added. The multiplication of the sine weighted signals can be expressed by the following equations where $\theta_i$ is the phase of the DPSK bit in shift registers 109 and 115, $\theta_{i-1}$ is the phase of the DPSK bit in shift registers 110 and 116 and $\theta_o$ is the phase difference between the DPSK signal and the clock signals 152 and 153:

$$\text{SIN }(\theta_i - \theta_o) \text{ SIN }(\theta_{i-1} - \theta_o) \text{ and,} \tag{1}$$

$$\text{SIN }(\theta_i - [\theta_o - 90°]) \text{ SIN }(\theta_{i-1} - [\theta_o - 90°]) = \text{COS }(\theta_i - \theta_o) \text{ COS }(\theta_{i-1} - \theta_o). \tag{2}$$

The sum of equations (1) and (2) is provided by adder 120 and may be trigonometrically reduced resulting in the following equation (3):

$$\text{SIN }(\theta_i - \theta_o) \text{ SIN }(\theta_{i-1} - \theta_o) + \text{COS }(\theta_i - \theta_o) \text{ COS }(\theta_{i-1} - \theta_o) = \text{COS }(\theta_i - \theta_{i-1}) \tag{3}$$

Equation (3) provides the cosine of the phase difference between the successive DPSK bits stored in each pair of shift registers. The derivation of the foregoing equations is detailed in U.S. Pat. No. 3,993,956.

The phase difference between the successive DPSK bits in the shift registers is continuously taken 15 times for each DPSK bit. Since the phase difference is continuously taken, it is not necessary to recover the carrier signal of the received DPSK signal. For each received DPSK bit, 15 bits are provided on the demodulated digital signal 155 to the correlator. The demodulated digital signal is delayed relative to the received DPSK signal by the time interval of one DPSK bit. Since the correlator receives the demodulated digital signal asynchronously, the correlator continuously monitors the demodulated digital signal for the digital start signal. For example, the correlator may load in response to the 18 kHz clock signal a register with a number of demodulated bits corresponding to the predetermined number of bits of the digital start signal, while continuously monitoring the demodulated bits in the register for the predetermined bit pattern of the digital start signal.

Once detecting the digital start signal in the register, the correlator may provide a message indication signal marking the beginning of the following digital message. Additional circuitry in the DPSK signal receiver may utilize the message indication signal to prepare other circuitry for receiving following data. The additional circuitry may recover the clock signal of the received DPSK signal if necessary for its particular function. Prior art techniques for data and clock recovery, such as those described in U.S. Pat. No. 3,980,824, can be utilized in the additional circuitry of the DPSK signal receiver.

The foregoing demodulation of the DPSK signal is provided by the data selector 117, read-only memory (ROM) 118, latch 119, adder 120 and comparator 121. The sine weighting and multiplication may be provided by individual functional blocks, as described in U.S. Pat. No. 3,993,956, or may be provided as illustrated here by the ROM 118. The ROM 118 contains the sine weighted and multiplied values for all possible values of the binary weighted output signals from each pair of integrators 105-106 and 107-108. The ROM 118 is addressed by either the A inputs or B inputs from the data selector 117. The data stored in the ROM 118 at the address from the data selector 117 is the sine weighted and multiplied value of the pair of binary weighted output signals from each pair of 1-bit integrators 105-106 and 107-108.

For each of the 15 bits corresponding to a DPSK bit, the data selector 117 first routes the A inputs, and next the B inputs, to the ROM 118. The data outputs from the ROM 118 for the data selector A inputs are temporarily stored in latch 119 until the ROM data outputs for the data selector B inputs are available. The latched outputs from latch 119 are then added to the succeeding ROM data outputs by binary adder 120, and the sum from the adder 120 is applied to comparator 121. The comparator 121 compares the sum from the adder 120 to a predetermined reference for ascertaining the logic state of the demodulated digital signal. For example, the comparator 121 may have a reference centered at zero, plus and minus a predetermined hysteresis. If consecutive DPSK bits are out of phase, the adder 120 will continuously present an output of −1. Conversely, if consecutive DPSK bits are in phase, the adder 120 will present an output of +1. Similarly, when the phase difference between consecutive DPSK bits changes, the adder output will also change correspondingly between +1 and −1.

The comparator 121 will then compare the adder output, which may be either +1 or −1, with the predetermined reference level of zero and provide a corresponding logical state, zero or one, on the demodulated digital signal. For example, the comparator 121 may provide a logic zero when the adder output is a +1 and a logic one when the adder output is a −1. The predetermined hysteresis of the reference level of the comparator 121 will tend to remove fluctuations around the zero crossing when the phase difference is changing between successive DPSK bits. Thus, the demodulated digital signal from the comparator 121 is comprised of 15 bits per DPSK bit, that are representative of the phase difference between consecutive DPSK bits. Furthermore, the demodulated digital signal will be delayed relative to the received DPSK signal by the time interval of one DPSK bit, as illustrated by the waveforms of FIG. 3.

The digital demodulator described hereinabove may be advantageously utilized for either PSK or DPSK signals having any suitable carrier frequency and bit frequency. The digital demodulator can readily compensate for a phase difference between the carrier signal and the clock signals 152 and 153. Furthermore, the digital demodulator may be constructed entirely from conventional digital integrated circuits.

The digital demodulator may also be configured with two ROM's 118, thereby eliminating the need for data selector 117 and latch 119. The first ROM may be fed by inputs A, formerly connected to the data selector 117, while the second ROM is fed by inputs B, formerly connected to the data selector 117. The ROM data outputs are then coupled directly to the adder 120 without the necessity of latch 119. The operation of the digital demodulator with two ROM's is essentially identical to the operation described hereinabove for the digital demodulator with one ROM.

The particular values stored in the ROM 118 are detailed in the following Table 1. The ROM address is listed first and the corresponding data word for that address is listed second. Both the ROM address and data words are expressed in hexadecimal based format. The ROM may be any of a number of commercially available ROM's or PROM's having the capacity of storing 256×9 bits. Storage for 9 bits is necessary since a sign bit is required in addition to an 8 bit value for each data word. For example, a custom ROM having a 256×9 bit capacity or two Signetics 1702A ROM's each having a 256×8 bit capacity can be utilized.

The digital demodulator of FIG. 1 can be mechanized using standard digital logic circuits, such as the CMOS logic circuits described in "The Semiconductor Data Library," Vol. 5, Series B, published by Motorola Semiconductor Products, Inc., 1976. Furthermore, the digital demodulator may be comprised of the digital logic circuits integratable into a suitable semiconductive substrate.

TABLE 1

| AD | DATA | AD | DATA | AD | DATA | AD | DATA |
|----|------|----|------|----|------|----|------|
| 00 | E1 | 20 | D2 | 40 | 96 | 60 | 4B |
| 01 | E1 | 21 | D2 | 41 | 96 | 61 | 4B |
| 02 | D2 | 22 | C4 | 42 | 8C | 62 | 46 |
| 03 | B4 | 23 | A8 | 43 | 78 | 63 | 3C |
| 04 | 96 | 24 | 8C | 44 | 64 | 64 | 32 |
| 05 | 78 | 25 | 70 | 45 | 50 | 65 | 28 |
| 06 | 4B | 26 | 46 | 46 | 32 | 66 | 19 |
| 07 | 1E | 27 | 1C | 47 | 14 | 67 | 0A |
| 08 | 1E2 | 28 | 1E4 | 48 | 1EC | 68 | 1F6 |
| 09 | 1B5 | 29 | 1BA | 49 | 1CE | 69 | 1E7 |
| 0A | 188 | 2A | 190 | 4A | 1B0 | 6A | 1D8 |
| 0B | 16A | 2B | 174 | 4B | 19C | 6B | 1CE |
| 0C | 14C | 2C | 158 | 4C | 188 | 6C | 1C4 |
| 0D | 12E | 2D | 13C | 4D | 174 | 6D | 1BA |
| 0E | 11F | 2E | 12E | 4E | 16A | 6E | 1B5 |
| 0F | 11F | 2F | 12E | 4F | 16A | 6F | 1B5 |
| 10 | E1 | 30 | B4 | 50 | 78 | 70 | 1E |
| 11 | E1 | 31 | B4 | 51 | 78 | 71 | 1E |
| 12 | D2 | 32 | A8 | 52 | 70 | 72 | 1C |
| 13 | B4 | 33 | 90 | 53 | 60 | 73 | 18 |
| 14 | 96 | 34 | 78 | 54 | 50 | 74 | 14 |
| 15 | 78 | 35 | 60 | 55 | 40 | 75 | 10 |
| 16 | 4B | 36 | 3C | 56 | 28 | 76 | 0A |
| 17 | 1E | 37 | 18 | 57 | 10 | 77 | 04 |
| 18 | 1E2 | 38 | 1E8 | 58 | 1F0 | 78 | 1FC |
| 19 | 1B5 | 39 | 1C4 | 59 | 1D8 | 79 | 1F6 |
| 1A | 188 | 3A | 1A0 | 5A | 1C0 | 7A | 1F0 |
| 1B | 16A | 3B | 188 | 5B | 1B0 | 7B | 1EC |
| 1C | 14C | 3C | 170 | 5C | 1A0 | 7C | 1E8 |
| 1D | 12E | 3D | 158 | 5D | 190 | 7D | 1E4 |
| 1E | 11F | 3E | 14C | 5E | 188 | 7E | 1E2 |
| 1F | 11F | 3F | 14C | 5F | 188 | 7F | 1E2 |
| 80 | 1E2 | A0 | 188 | C0 | 14C | E0 | 11F |
| 81 | 1E2 | A1 | 188 | C1 | 14C | E1 | 11F |
| 82 | 1E4 | A2 | 190 | C2 | 158 | E2 | 12E |
| 83 | 1E8 | A3 | 1A0 | C3 | 170 | E3 | 14C |
| 84 | 1EC | A4 | 1B0 | C4 | 188 | E4 | 16A |
| 85 | 1F0 | A5 | 1C0 | C5 | 1A0 | E5 | 188 |
| 86 | 1F6 | A6 | 1D8 | C6 | 1C4 | E6 | 1B5 |
| 87 | 1FC | A7 | 1F0 | C7 | 1E8 | E7 | 1E2 |
| 88 | 04 | A8 | 10 | C8 | 18 | E8 | 1E |
| 89 | 0A | A9 | 28 | C9 | 3C | E9 | 4B |
| 8A | 10 | AA | 40 | CA | 60 | EA | 78 |
| 8B | 14 | AB | 50 | CB | 78 | EB | 96 |
| 8C | 18 | AC | 60 | CC | 90 | EC | B4 |
| 8D | 1C | AD | 70 | CD | A8 | ED | D2 |
| 8E | 1E | AE | 78 | CE | B4 | EE | E1 |
| 8F | 1E | AF | 78 | CF | B4 | EF | E1 |
| 90 | 1B5 | B0 | 16A | D0 | 12E | F0 | 11F |
| 91 | 1B5 | B1 | 16A | D1 | 12E | F1 | 11F |
| 92 | 1BA | B2 | 174 | D2 | 13C | F2 | 12E |
| 93 | 1C4 | B3 | 188 | D3 | 158 | F3 | 14C |
| 94 | 1CE | B4 | 19C | D4 | 174 | F4 | 16A |
| 95 | 1D8 | B5 | 1B0 | D5 | 190 | F5 | 188 |
| 96 | 1E7 | B6 | 1CE | D6 | 1BA | F6 | 1B5 |
| 97 | 1F6 | B7 | 1EC | D7 | 1E4 | F7 | 1E2 |
| 98 | 0A | B8 | 14 | D8 | 1C | F8 | 1E |
| 99 | 19 | B9 | 32 | D9 | 46 | F9 | 4B |
| 9A | 28 | BA | 50 | DA | 70 | FA | 78 |
| 9B | 32 | BB | 64 | DB | 8C | FB | 96 |
| 9C | 3C | BC | 78 | DC | A8 | FC | B4 |
| 9D | 46 | BD | 8C | DD | C4 | FD | D2 |
| 9E | 4B | BE | 96 | DE | D2 | FE | E1 |
| 9F | 4B | BF | 96 | DF | D2 | FF | E1 |

I claim:

1. In a digital demodulator for digital signals including a digital message preceded by a digital start signal and serially encoded according to phase shift keying (PSK) at a predetermined carrier frequency and predetermined bit frequency, the digital start signal having a predetermined number of bits arranged according to a predetermined bit pattern, said digital demodulator including an oscillator for providing a master clock signal at a multiple of the predetermined carrier frequency, timing circuitry responsive to the oscillator for providing first and second quadrature-related clock signals each at substantially the same frequency as the predetermined carrier frequency, a sampler for digitally sampling the PSK signal at the master-clock frequency and first and second multipliers for multiplying the sampled PSK signal and the first and second clock signals to provide first and second output signals, respectively, and said digital demodulator further including improvement comprising:

first one-bit integrating means receiving the first output signal of the first multiplier and continuously providing in response to the master clock signal a first weighted output signal and the first output signal delayed by one bit;

second one-bit integrating means receiving the delayed first output signal from the first one-bit integrating means for continuously providing in response to the master clock signal a second weighted output signal;

third one-bit integrating means receiving the second output signal of the second multiplier and continuously providing in response to the master-clock signal a third weighted output signal and the second output signal delayed by one bit;

fourth one-bit integrating means receiving the delayed second output signal from the third one-bit integrating means for continuously providing in response to the master clock signal a fourth weighted output signal;

means for continuously taking at the master-clock frequency the trigonometric sine value of each of the first, second, third and fourth weighted output signals;

means for continuously multiplying at the master-clock frequency the sine values of the first and second weighted output signals and the sine values of the third and fourth weighted output signals to provide first and second multiplied output signals, respectively;

means for continuously adding at the master-clock frequency the first and second multiplied output signals to provide a phase indication signal;

means for continuously comparing the phase indication signal to a predetermined reference signal and providing a demodulated output signal having a predetermined first state when the phase indication signal is greater than the predetermined reference signal and a predetermined second state when the phase indication signal is less than the predetermined reference signal.

2. The digital demodulator according to claim 1, further including correlating means responsive to the demodulated output signal for providing a message indication signal when detecting the predetermined bit pattern of the digital start signal.

3. The digital demodulator according to claim 1, wherein the first, second, third and fourth one-bit integrating means each further include first, second, third and fourth register means and counting means, respectively;

the first register means of the first one-bit integrating means responsive to the master clock signal for serially receiving the first output signal and providing the first output signal delayed by one bit, the first counting means receiving the first output signal and the once delayed first output signal and continuously providing in response to the master clock signal the first weighted output signal;

the second register means of the second one-bit integrating means responsive to the master clock signal for serially receiving the once delayed first output signal and providing the first output signal delayed by two bits, the second counting means receiving the once delayed first output signal and the twice delayed first output signal and continuously providing in response to the master clock signal the second weighted output signal;

the third register means of the third one-bit integrating means responsive to the master clock signal for serially receiving the second output signal and providing the second output signal delayed by one bit, the third counting means receiving the second output signal and the once delayed second output signal and continuously providing in response to the master clock signal the third weighted output signal; and the fourth register means of the fourth one-bit integrating means responsive to the master clock signal for serially receiving the once delayed second output signal and providing the second output signal delayed by two bits, the fourth counting means receiving the once delayed second output signal and the twice delayed second output signal and continuously providing in response to the master clock signal the fourth weighted output signal.

4. The digital demodulator according to claim 1, wherein the trigonometric sine means and the multiplying means are provided by a memory means, the memory means containing the first and second multiplied output signals at locations addressed by the first and second weighted output signals and the third and fourth weighted output signals, respectively, the memory means responsive to the master clock signal for continuously reading out the first and second multiplied output signals from the respectively addressed locations.

5. The digital demodulator according to claim 1, wherein the trigonometric sine means, multiplying means and adding means are provided by a memory means, the memory means containing the phase indication signal at locations addressed by the first, second, third and fourth weighted output signals, the memory means responsive to the master clock signal for continuously reading out the phase indication signals from the respectively address locations.

6. The digital demodulator according to claim 1, wherein the trigonometric sine means and multiplying means are provided by a first and second memory means, the first memory means containing the first multiplied output signals at locations addressed by the first and second weighted output signals, the second memory means containing the second multiplied output signals at locations addressed by the third and fourth weighted output signals, the first and second memory means responsive to the master clock signal for continuously reading out the first and second multiplied output signals from the respectively addressed locations.

7. The digital demodulator according to claim 1, further including a semiconductive substrate, said digital demodulator comprised of digital logic circuits integrated into the semiconductive substrate.

8. The digital demodulator according to claim 1, wherein the digital signals are serially encoded according to differential phase shift keying (DPSK) at a predetermined carrier frequency and predetermined bit frequency.

9. The digital demodulator according to claims 4 or 5, wherein the memory means is a read-only memory.

10. The digital demodulator according to claim 6, wherein the first and second memory means are first and second read-only memories.

11. In a digital demodulator for digital signals serially encoded according to phase shift keying (PSK) at a predetermined carrier frequency and predetermined bit frequency, said digital demodulator including an oscillator for providing a master clock signal at a multiple of the predetermined carrier frequency, timing circuitry responsive to the oscillator for providing first and second quadrature-related clock signals each at substantially the same frequency as the predetermined carrier frequency, a sampler for digitally sampling the PSK signal at the master-clock frequency and first and second multipliers for multiplying the sampled PSK signal and the first and second clock signals to provide first and second output signals, respectively, and said digital demodulator further including improvement comprising:

first one-bit integrating means receiving the first output signal of the first multiplier and continuously providing in response to the master clock signal a first weighted output signal and the first output signal delayed by one bit;

second one-bit integrating means receiving the delayed first output signal from the first one-bit integrating means for continuously providing in response to the master clock signal a second weighted output signal;

third one-bit integrating means receiving the second output signal of the second multiplier and continuously providing in response to the master-clock signal a third weighted output signal and the second output signal delayed by one bit;

fourth one-bit integrating means receiving the delayed second output signal from the third one-bit integrating means for continuously providing in response to the master clock signal a fourth weighted output signal;

means for continuously taking at the master-clock frequency the trigonometric sine value of each of the first, second, third and fourth weighted output signals;

means for continuously multiplying at the master-clock frequency the sine values of the first and second weighted output signals and the sine values of the third and fourth weighted output signals to provide first and second multiplied output signals, respectively;

means for continuously adding at the master-clock frequency the first and second multiplied output signals to provide a phase indication signal;

means for continuously comparing the phase indication signal to a predetermined reference signal and providing a demodulated output signal having a predetermined first state when the phase indication signal is greater than the predetermined reference signal and a predetermined second state when the phase indication signal is less than the predetermined reference signal.

* * * * *